No. 883,454. PATENTED MAR. 31, 1908.
G. W. DUNHAM.
MUD SHIELD FOR VEHICLE WHEEL GUARDS.
APPLICATION FILED DEC. 1, 1906.
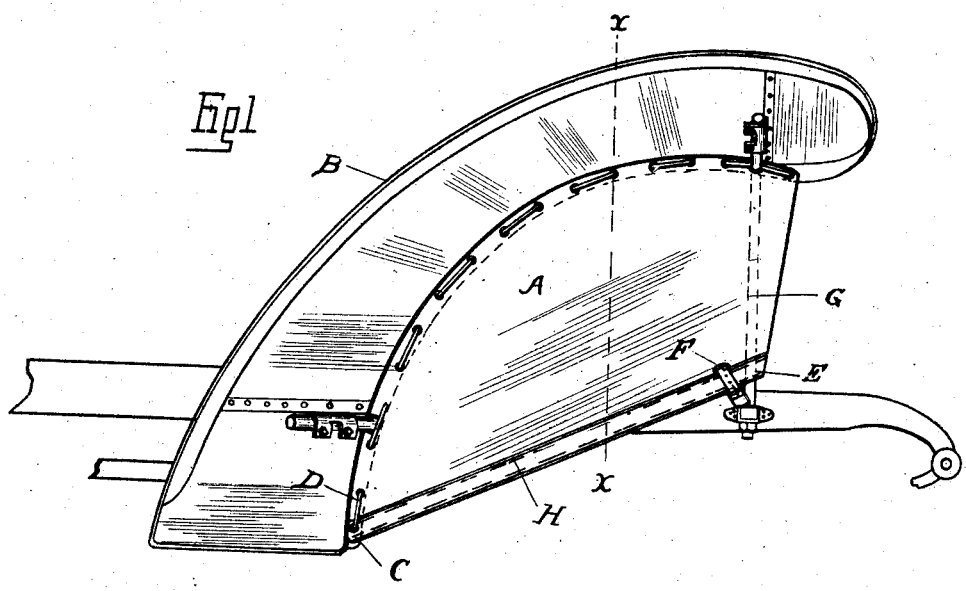
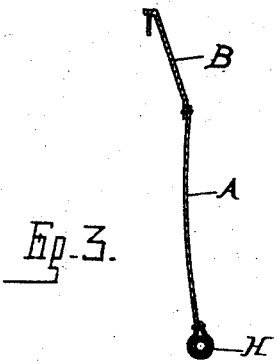
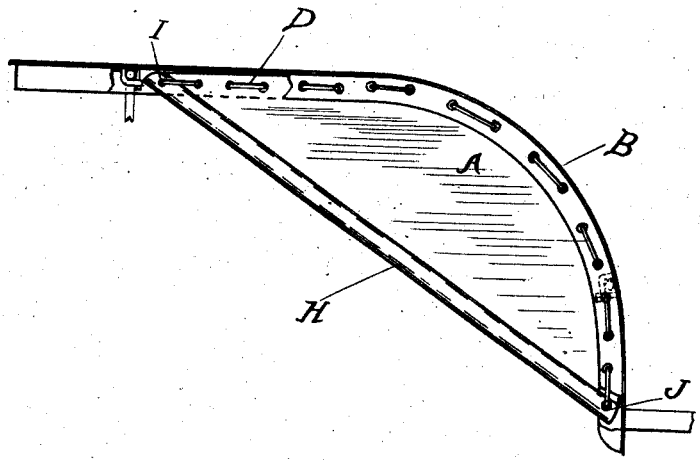
Witnesses
Inventor
George W. Dunham.

UNITED STATES PATENT OFFICE.

GEORGE W. DUNHAM, OF LANSING, MICHIGAN, ASSIGNOR TO OLDS MOTOR WORKS, OF LANSING, MICHIGAN, A CORPORATION OF MICHIGAN.

MUD-SHIELD FOR VEHICLE-WHEEL GUARDS.

No. 883,454.     Specification of Letters Patent.     Patented March 31, 1908.

Application filed December 1, 1906. Serial No. 345,918.

*To all whom it may concern:*

Be it known that I, GEORGE W. DUNHAM, a citizen of the United States of America, residing at Lansing, in the county of Ingham and State of Michigan, have invented certain new and useful Improvements in Mud-Shields for Vehicle-Wheel Guards, of which the following is a specification, reference being had therein to the accompanying drawings.

The invention is particularly designed for use upon automobiles, and consists in the novel construction and combination of a mud shield with the mud guard or fender commonly used.

In the drawings, Figure 1 is a side elevation of the shield and fender for the front wheel of the vehicle; Fig. 2 is a similar view of the construction for the rear wheel; and Fig. 3 is a cross section on line $x$—$x$, Fig. 1.

In the use of automobiles provided with wheel fenders of the ordinary type, it has been found that mud will be thrown from the wheels inside the fender and against the vehicle body. To avoid this, in my improved construction, a shield A, formed of any suitable sheet material, is attached to the edge of the wheel fender B and extends downward therefrom adjacent to the side of a segment of the wheel. For the front wheel of the vehicle, as illustrated in Fig. 1, the shield preferably extends along the inner edge of the fender B to the lower end thereof, being preferably attached by a lacing, as indicated at D. From the point C, the edge of the shield extends inward toward the center of the wheel, being preferably also inclined slightly upward, and the inner end E is attached by suitable means to the vehicle frame. As shown, the attachment of the point E is formed by securing it to a clip F attached to the base of the fender supporting arm G. The shield is further preferably provided with a stiffening rod H, extending along its lower edge, and preferably formed of a tube inserted in a pocket at the lower edge of the shield.

In Fig. 2 the construction is similar to that in Fig. 1, with exception that the reinforcement or stiffened edge of the shield extends in a straight line between the opposite points of attachment to the fender I and J. This construction being designed for use on the rear wheel does not require the shield to extend as far inward as for the front wheel, and, therefore, it is unnecessary to provide the inward extension, or separate means of attaching the inner edge of the shield, to the frame.

With the construction as described, when the shields are in position, the mud thrown from the wheels will be prevented from striking the vehicle body, while the stiffened edge of the shield, and its attachment to the frame, will prevent interference with the wheels.

What I claim as my invention is:

1. The combination with a wheel fender, of a sector-shaped shield attached to one edge of said fender, a fender supporting arm, and an attachment between said shield and said supporting arm near the center of the sector.

2. The combination with a wheel fender, of a sector-shaped shield laced to one edge of said fender, and extending inwardly therefrom, and a reinforcement for the inner edge of said shield.

3. In a motor vehicle, the combination with the fender for the forward wheel, of a sector-shaped shield secured to the inner edge of said fender and extending to the lower end thereof, a reinforcement for the lower edge of said shield, and means for attaching said shield to the vehicle frame near the center of the sector.

In testimony whereof I affix my signature in presence of two witnesses.

GEORGE W. DUNHAM.

Witnesses:
    CHAS. D. HASTINGS,
    RALPH R. OWEN.